United States Patent [19]

Palochak et al.

[11] Patent Number: 4,793,671
[45] Date of Patent: Dec. 27, 1988

[54] OPTICAL EFFECTS DEVICE

[76] Inventors: John B. Palochak; John C. Palochak, both of 227 Chico Ave., Santa Cruz, Calif. 95060

[21] Appl. No.: 100,348

[22] Filed: Sep. 23, 1987

[51] Int. Cl.⁴ .......................................... G02B 23/00
[52] U.S. Cl. ...................................... 350/4.1
[58] Field of Search ....................... 350/4.1

[56] References Cited

U.S. PATENT DOCUMENTS 2,764,057  9/1956  Oller, Sr. ................. 350/4.1
4,061,414 12/1977  Price ....................... 350/4.1

Primary Examiner—Richard A. Wintercorn
Attorney, Agent, or Firm—John J. Morrissey

[57] ABSTRACT

An optical effects device which is adaptable as a container is disclosed. The device is a hollow, elongated structure having a viewing port at one end and an opaque wall at the other. The opaque wall has an apertured portion of predetermined design to admit light. The interior of the device is bounded by a plurality of substantially planar interior walls that are light reflective and extend from one end of the hollow structure to the other. Light passing through the apertured portion of the end wall is reflected by the interior walls to form corresponding images of the aperture in a generally annular arrangement around the apertured portion of the end, wall when a viewer looks into the interior of the hollow structure through the viewing port.

7 Claims, 2 Drawing Sheets

U.S. Patent   Dec. 27, 1988   Sheet 1 of 2   4,793,671
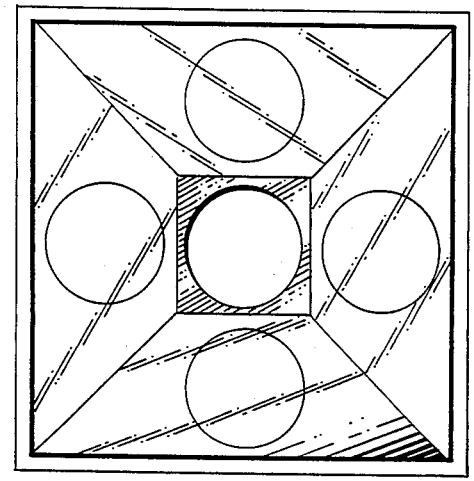
FIG_4
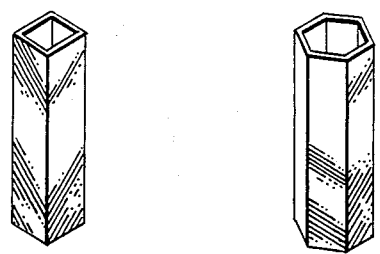
FIG_6
FIG_7
FIG_8
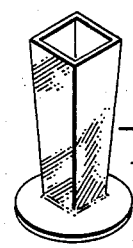
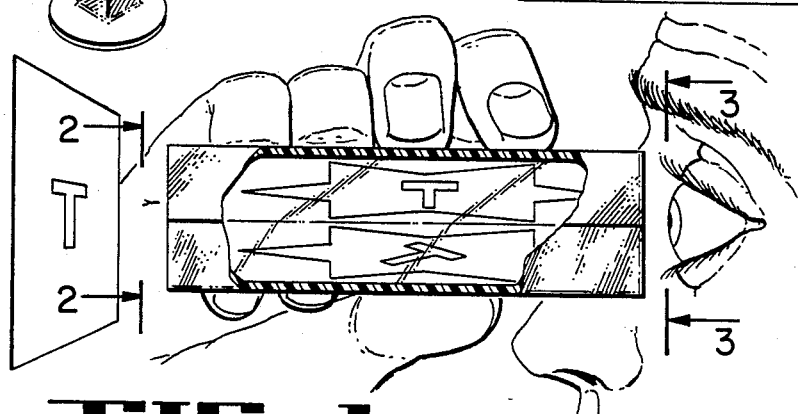
FIG_1
FIG_2
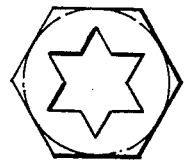
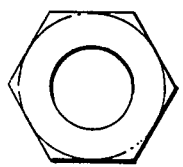
FIG_5
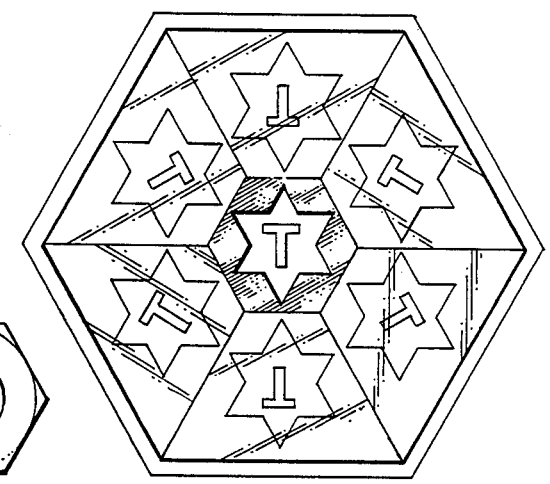
FIG_3

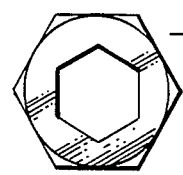
FIG_11
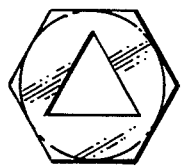
FIG_12
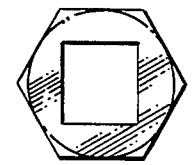
FIG_10
FIG_9

OPTICAL EFFECTS DEVICE

TECHNICAL FIELD

This invention pertains to optical effects devices, and particularly to a viewing device for entertainment purposes that can also function as a container for items such as food specialties.

BACKGROUND ART

Viewing devices used for amusement in the prior art have included Kaleidoscopic instruments, which typically included loose fragments of colored glass and a plurality of planar mirrors, the mirrors being arranged so that changes of position of the colored glass fragments result in corresponding changes in symmetrical varicolored patterns that are visible to a viewer looking through the instrument.

SUMMARY OF THE INVENTION

It is an object of the present invention to provide an optical effects device for viewing symmetrical patterns for amusement. A device according to the present invention is an integral structure (i.e., a structure without separate moving parts such as loose fragments of glass as in a Kaleidoscope), and can preferably also be used as a container for an item such as a food specialty.

An optical effects device according to the present invention is a hollow structure of elongate configuration having a plurality of symmetrically arranged interior walls of high reflectivity extending generally parallel or at a relatively small angle of inclination with respect to an axis of elongation of the structure. One end of the device is open or transparent, and the other end thereof is opaque with an apertured portion in the form of a predetermined design. In operation, the open end of the device is held adjacent a viewer's eye, and the apertured opaque end is pointed toward a source of light. The viewer looks into the device toward the apertured opaque end thereof, and sees the design of the aperture and also an annular arrangement around the aperture of a plurality of reflections of the same design in various orientations.

In a particular embodiment of an optical effects device according to the present invention, the number and the orientations of the reflections of the design of the aperture on the opaque end of the device depending upon the number of reflective interior walls present in the device. There must be at least three reflective interior walls, and the number of reflections of the design of the aperture seen by the viewer corresponds to the number of reflective interior walls. Each reflective interior wall contributes a corresponding reflective image of the design of the aperture to the annular arrangement of images.

Viewing the arrangement of image of a selected design produced by an optical effects device according to the present invention is itself a source of amusement. However, it is also intended that a device according to the present invention function as a container for an item such as ice cream cone or similar food specialty. A device according to the present invention is preferably an inexpensive structure made of a plastic material, and can be manufactured in large quantities for distribution as sales novelties.

DESCRIPTION OF THE DRAWING

FIG. 1 is a plan view, partially broken away, of an optical effects device according to the present invention in which there are six reflective interior walls.

FIGS. 2, 5, 10, 11 and 12 illustrate five alternative views to be seen along line 2—2 of FIG. 1 corresponding to five different embodiments of the apertured portion of the opaque end of the optical effects device of FIG. 1.

FIG. 3 illustrates a view along line 3—3 of FIG. 1 showing a selected design for the apertured portion of the opaque end of the optical effects device of FIG. 1.

FIG. 4 is a transverse cross-sectional view of an alternative embodiment of an optical effects device according to the present invention in which there are four reflective interior walls.

FIGS. 6, 7, 8 and 9 illustrate four different configurations of an optical effects device according to the present invention in perspective view.

BEST MODE OF CARRYING OUT THE INVENTION

A preferred embodiment of an optical effects device according to the present invention comprises a hollow cylindrical structure whose interior is of hexagonal cross-sectional configuration in a plane transverse to the cylindrical axis of the structure, as illustrated in FIG. 1. There are six elongate interior walls of the device, which are symmetrical about and extend parallel to the cylindrical axis. Each elongate interior wall is reflective of visible light. One end of the device is open or transparent, and the other end is closed by an apertured end wall. The end wall is opaque to visible light, but the apertured portion thereof transmits visible light therethrough. The apertured portion of the end wall has a selected design, several possibilities for which are shown in transverse cross-sectional detail in FIGS. 2, 5, 10, 11 and 12.

In FIG. 2, the apertured portion of the opaque end wall is shown as a six-pointed star, which is the configuration of the apertured portion of the end wall of the device illustrated in FIG. 1. In FIG. 11, the apertured portion of the end wall is shown as a hexagon. In FIGS. 12, 10 and 5, the apertured portion of the end wall is shown as a triangle, a square and a circle, respectively. It is to be recognized, however, that in a particular application the aperture in the end wall could assume the form of, e.g., a person, an animal, a plant, a building, a geological shape, a political symbol, a cartoon character, or any one of a variety of other types of configurations.

In operation, as illustrated in FIG. 1, a viewer holds the open end of the optical effects device to his eye, and points the apertured other end of the device toward a source of light or toward an object that is illuminated by a source of light. During daylight hours, the source of light could be any region of the sky. In the example illustrated in FIG. 1, the viewer has pointed the apertured end of the device toward a letter "T" printed on a card that is illuminated by ambient light.

Each of the reflective interior walls of the optical effects device forms a corresponding reflective image of the apertured portion of the end wall and of any object seen through the apertured position of the end wall. The viewer sees the reflective images in a pattern around the apertured portion of the end wall. Thus, as shown in FIG. 1 wherein the optical effects device is pointed toward a letter "T", the viewer sees the letter "T" in the center of the star-shaped aperture in the end wall of the device, and sees an annular pattern of reflections of the letter "T" surrounding the aperture. Each reflection of the letter "T" is positioned within a corresponding reflection of the aperture, but each reflection is oriented differently corresponding to the orientation of the reflective interior wall producing the image.

In an alternative embodiment as illustrated in FIG. 4, the optical effects device has four reflective interior walls arranged cylindrically so as to have a square transverse cross-sectional configuration, and an end wall with a circular aperture. Accordingly, when a viewer looks through the device toward a source of light such as a clear region of the sky, the viewer sees the circular aperture on the cylindrical axis of the device and four reflective images of the circular aperture in an annular pattern around the axis.

Perspective views of various configurations for optical effects devices according to the present invention are illustrated in FIGS. 6, 7, 8 and 9. In FIG. 6, the optical effects device is shown having a square cylindrical configuration. In FIG. 9, the device is shown having a triangular cylindrical configuration. In FIG. 7, the device is shown having a hexagonal cylindrical configuration as in FIG. 1. It is not essential that the device be precisely cylindrical. Thus, as illustrated in FIG. 8, the device could be of frustoconical configuration, which in certain applications could facilitate use of the device as a container. The embodiment shown in FIG. 8 is provided with a relatively wide base at its apertured end, which serves as a stand when the device is being used as, e.g., a flower holder.

This invention has been described above in terms of particular embodiments, which are presented as illustrative of the general concept. However, other embodiments will readily suggest themselves to an entrepreneur who becomes familiar with the foregoing description. Therefore, the invention is not limited to the particular embodiments disclosed herein, but is more generally defined by the following claims and their equivalents.

We claim:

1. An optical effects device adaptable as a container, said device comprising a hollow structure elongate about an axis, said hollow structure having a viewing port at a first end thereof and an opaque end wall at a second end thereof, said end wall extending generally transverse to said axis, said end wall having an apertured portion of predetermined design through which light can be transmitted, said hollow structure having an empty interior bounded by a plurality of substantially planar interior walls that are reflective of light, said viewing port being defined by end portions of said reflective interior walls at said first end of said hollow structure, said reflective interior walls extending from said first to said second end of said hollow structure so that light passing through said apertured portion of said end wall is reflected from said interior walls to form corresponding images of said apertured portion of said end wall, said images of said apertured portion of said end wall being seen in a generally arrangement around said apertured portion of said end wall when a viewer looks into the interior of said hollow structure through said viewing port at said first end of said hollow structure.

2. The device of claim 1 wherein said reflective interior walls extend generally parallel to said axis, said device thereby having a generally cylindrical configuration.

3. The device of claim 1 wherein said reflective interior walls converge toward said axis, said device thereby having a generally frustoconical configuration.

4. The device of claim 1 wherein said plurality of reflective interior walls comprises three interior walls disposed so as to define an interior volume of triangular cylindrical configuration.

5. The device of claim 1 wherein said plurality of reflective interior walls comprises n interior walls disposed so as to define an interior volume of n-sided cylindrical configuration, where n represents any whole number.

6. The device of claim 1 wherein said reflective interior walls are substantially planar.

7. The device of claim 1 wherein said second end of said hollow structure is mounted on a support structure, said support structure being configured so that said device can stand with axis of said hollow structure in a generally vertical orientation when said support structure is placed on a flat surface.

* * * * *

UNITED STATES PATENT AND TRADEMARK OFFICE
CERTIFICATE OF CORRECTION

PATENT NO. : 4,793,671
DATED : December 27, 1988
INVENTOR(S) : John B. Palochak et al.

It is certified that error appears in the above-identified patent and that said Letters Patent are hereby corrected as shown below:

Column 4, line 11: After "first" insert --end--.

Column 4, line 16: After "generally" insert --annular-.

Column 4, line 43: After "with" insert --said--.

Signed and Sealed this

Twentieth Day of June, 1989

Attest:

DONALD J. QUIGG

Attesting Officer

Commissioner of Patents and Trademarks